United States Patent
Kyotani et al.

(10) Patent No.: US 9,523,163 B2
(45) Date of Patent: Dec. 20, 2016

(54) METHOD FOR PRODUCING CARBON MATERIAL USING CATALYST, AND CARBON MATERIAL

(71) Applicant: NIPPON PAPER INDUSTRIES CO., LTD., Tokyo (JP)

(72) Inventors: Mutsumasa Kyotani, Tsukaba (JP); Kazuo Akagi, Kyoto (JP); Shinichi Kimura, Tottori (JP)

(73) Assignee: NIPPON PAPER INDUSTRIES CO., LTD., Tokyo (JP)

( * ) Notice: Subject to any disclaimer, the term of this patent is extended or adjusted under 35 U.S.C. 154(b) by 26 days.

(21) Appl. No.: 14/405,650

(22) PCT Filed: Jun. 5, 2013

(86) PCT No.: PCT/JP2013/065579
§ 371 (c)(1),
(2) Date: Dec. 4, 2014

(87) PCT Pub. No.: WO2013/183668
PCT Pub. Date: Dec. 12, 2013

(65) Prior Publication Data
US 2015/0167200 A1   Jun. 18, 2015

(30) Foreign Application Priority Data
Jun. 5, 2012   (JP) ................... 2012-128253

(51) Int. Cl.
*C01B 31/02* (2006.01)
*D01F 9/16* (2006.01)
*H01M 8/02* (2016.01)

(52) U.S. Cl.
CPC .............. *D01F 9/16* (2013.01); *C01B 31/02* (2013.01); *H01M 8/0234* (2013.01); *Y02P 70/56* (2015.11)

(58) Field of Classification Search
CPC .................................................. C01B 31/02
See application file for complete search history.

(56) References Cited

U.S. PATENT DOCUMENTS

| 4,412,675 A | 11/1983 | Kawakubo |
| 5,102,855 A | 4/1992 | Greinke et al. |
| 6,143,213 A * | 11/2000 | Furukawa ............. H01M 4/587 264/29.1 |
| 8,057,774 B2 * | 11/2011 | Kim ........................ B01J 21/18 423/445 R |
| 2010/0081351 A1 | 4/2010 | Hong et al. |

FOREIGN PATENT DOCUMENTS

| CN | 101463578 A | 6/2009 |
| EP | 2 159 193 A1 | 3/2010 |
| JP | 1-44671 B2 | 9/1989 |
| JP | 4-231314 A | 8/1992 |
| JP | 2007-055865 A | 3/2007 |
| JP | 2007-529403 A | 10/2007 |
| JP | 2009-292676 A | 12/2009 |
| JP | 2011-113768 A | 6/2011 |
| WO | WO 2005/089145 A2 | 9/2005 |

OTHER PUBLICATIONS

Bridgwater, A.V., Hofbauer, H., Van Loo, S. Thermal Biomass Conversion, CPL Press, London, UK, 2009: Bridgwater, A.V., "Fast Pyrolysis of Biomass," pp. 37-78.
Bridgwater, A.V., Hofbauer, H., Van Loo, S. Thermal Biomass Conversion, CPL Press, London, UK, 2009: den Uil, H., "Biofuels for Transport", pp. 301-321.
Bridgwater, A.V., Hofbauer, H., Van Loo, S. Thermal Biomass Conversion, CPL Press, London, UK, 2009: Di Blasi, C. and A. Galgano, "Science and Modelling—Literature Review on Fundamental Aspects of Thermal and Chemical Conversions of Biomass," pp. 267-282.
Bridgwater, A.V., Hofbauer, H., Van Loo, S. Thermal Biomass Conversion, CPL Press, London, UK, 2009: Galgano, A. and C. Di Blasi, "Science and Modellin—Review of Ongoing Research and Industrial Needs," pp. 283-300.
Bridgwater, A.V., Hofbauer, H., Van Loo, S. Thermal Biomass Conversion, CPL Press, London, UK, 2009: Oasmaa, A. and D. Meier, "Norms and Standards," pp. 79-93.
English translation of International Preliminary Report on Patentability issued Dec. 8, 2014, in PCT International Application No. PCT/JP2013/065579.
Pielichowski, K. and Njuguna, J., Thermal Degredation of Polymeric Materials, Rapra, Shawbury, UK, 2005: Natural Polymers, 6.3 Cellulose, pp. 133-138.
Database WPI Week 201139, Thomson Scientific, London, GB; AN 2011-G55273 & JP 2011-113768 A Jun. 9, 2011, Abstract.
Extended European Search Report issued Jan. 22, 2016, in European Patent Application No. 13801452.7.
Office Action issued Dec. 22, 2015, in Chinese Patent Application No. 201380029853.1.

* cited by examiner

*Primary Examiner* — Stuart Hendrickson
(74) *Attorney, Agent, or Firm* — Birch, Stewart, Kolasch & Birch, LLP

(57) ABSTRACT

Provided is a method for producing a carbon material, the method utilizing a cellulosic material and enables the carbon material, which retains the shape of the cellulosic material, to be produced in high yield. The method for producing a carbon material is characterized by comprising the steps of: allowing a cellulosic material and/or a regenerated cellulosic material to adsorb a sulfonic acid; and heating the cellulosic material and/or the regenerated cellulosic material which has adsorbed the sulfonic acid at a temperature of 600-2800° C. in an inert gas atmosphere.

6 Claims, No Drawings

METHOD FOR PRODUCING CARBON MATERIAL USING CATALYST, AND CARBON MATERIAL

TECHNICAL FIELD

The present invention relates to a method for producing a carbon material and a carbon material, particularly relates to a method using a cellulosic material and/or a regenerated cellulosic material and enabling a carbon material, which retains the shape of the cellulosic material and/or the regenerated cellulosic material, to be produced in high yield, and a carbon material obtained through the production method, which retains the shape of the raw material.

BACKGROUND ART

Carbon materials derived from cellulosic materials and/or regenerated cellulosic materials as the raw materials thereof are used in a variety of fields. Currently, such carbon materials are used in the form of a fiber, particle, or mass in many cases, while there are very few application examples of carbon materials in a thin planar form such as film or membrane. Examples of such a planar-form carbon material include conductive carbon paper or cloth, which is a carbon fiber product used as a material for a gas diffusion layer in an electrode of a fuel cell and is quite expensive.

It is appreciated that heating a cellulosic material at high temperature in an inert gas results in dehydration and depolymerization of the cellulosic material through pyrolysis, induces complex degradation reactions, which include generation of low-molecular-weight materials such as levoglucosan, and the like; as well as it produces CO, $CO_2$, $H_2O$, and other volatile gases, and finally leaves a black material composed mainly of carbon (Non-patent Documents 1 and 2).

Due to such features of pyrolysis, it is quite difficult for a cellulosic material having a form of, for example, film to retain the shape thereof and the obtained carbon material is very fragile.

Recently, a technology which takes advantage of the properties of cellulosic materials has been reported, in which network-type and sheet-type carbon materials, which have large specific surface areas and novel configurations and varied graphitization rates, can be obtained in high yield from a gel-like bacterial cellulose produced by a bacteria (Patent Document 1). Moreover, recently, the inventors have reported that a carbon material which retains the shape of a cellulosic material can be provided by treating the cellulosic material with a halogen or a halide prior to heat treatment (Patent Document 2).

RELATED ART DOCUMENTS

Patent Documents

Patent Document 1: Japanese Unexamined Patent Application Publication No. 2007-55865
Patent Document 2: Japanese Unexamined Patent Application Publication No. 2009-292676

Non-Patent Documents

Non-patent Document 1: Pielichowski, K., and Njuguna, J. Thermal Degradation of Polymeric Materials, Rapra, Shawbury, UK, 2005.

Non-patent Document 2: Bridgwater, A. V., Hofbauer, H., Van Loo, S. Thermal Biomass Conversion, CPL Press, London, UK, 2009.

SUMMARY OF THE INVENTION

Problems to be Solved by the Invention

The above-described Patent Document 1 has reported that a carbon material can be obtained excellently from a bacterial cellulosic material. However, since the bacterial cellulosic material is a gelatinous material, problems associated with a bacterial cellulosic material arose, in which the bacterial cellulose should be dried at a drying step while the network configuration thereof was retained; furthermore, the shrinkage rate of the bacterial cellulose should be controlled during the drying step to be within a predefined range; and the like. Moreover, the production method described in Patent Document 2 uses a halogen gas and therefore has a feature that the halogen molecules are adsorbed to cellulose in the gas phase and requires some attention to handling the halogen, which proves that the production method has room for improvement.

Thus, the purpose of the present invention is to provide a method for producing a carbon material, the method utilizing a cellulosic material and/or a regenerated cellulosic material to produce a carbon material in high yield which retains the shape of the cellulosic material and/or the regenerated cellulosic material.

Means for Solving the Problems

The inventors studied intensively and eventually found that the above-described problems can be resolved by using a sulfonic acid as a catalyst for carbonization, which is relatively easy to handle, and thereby completed the present invention.

That is, a method for producing a carbon material of the present invention comprises the steps of: allowing a cellulosic material and/or a regenerated cellulosic material to adsorb a sulfonic acid; and heating the cellulosic material and/or the regenerated cellulosic material which has adsorbed the sulfonic acid at a temperature of 600-2800° C., and preferably of 600-1000° C., in an inert gas atmosphere.

Moreover, another method for producing a carbon material of the present invention comprises the steps of: allowing a cellulosic material and/or a regenerated cellulosic material to adsorb a sulfonic acid; heating the cellulosic material and/or the regenerated cellulosic material which has adsorbed the sulfonic acid at a temperature of 600-2800° C., and preferably of 600-1000° C., in an inert gas atmosphere; and cooling the heat-treated cellulosic material and/or regenerated cellulosic material to room temperature and subsequently reheating the heat-treated cellulosic material and/or regenerated cellulosic material at a temperature of 1800-3000° C. in an inert gas atmosphere.

In the methods for producing a carbon material of the present invention, the step of adsorbing the sulfonic acid is preferably carried out by immersing the cellulosic material and/or the regenerated cellulosic material in an aqueous solution of the sulfonic acid at room temperature.

Moreover, in the methods for producing a carbon material of the present invention, the concentration of the sulfonic acid in the aqueous solution is preferably 0.1-2.0 mol/L.

Moreover, in the methods for producing a carbon material of the present invention, the sulfonic acid may be either an aliphatic or aromatic sulfonic acid. Specifically, any one of water-soluble sulfonic acids and the like such as methanesulfonic acid, p-toluenesulfonic acid, naphthalenesulfonic acid, benzenesulfonic acid and camphorsulfonic acid is preferably used alone.

Moreover, in the methods for producing a carbon material of the present invention, the cellulosic material and/or the regenerated cellulosic material is preferably in a form selected from the group consisting of spun yarn, monofilament, paper, film, sheet, woven fabric and knitted fabric.

A carbon material of the present invention is obtained through either of the above-described methods for producing a carbon material and characterized in that the form of a cellulosic material and/or a regenerated cellulosic material used as a raw material is retained.

Effects of the Invention

According to the present invention, in a cellulosic material which has adsorbed a sulfonic acid, water ($H_2O$) is removed from cellulose molecules through the dehydrating function of the sulfonic acid as temperature increases, and thus pyrolysis reaction is hardly induced and many carbons in the cellulose molecules are left in the form of a carbonized material, which therefore enables carbonization with high carbonization yield and shape-retention capability to be achieved. Thus, carbonization of a cellulosic material with retaining the shape thereof in such a manner also enables a conductive carbon film to be produced in high carbonization yield from, for example, traditional Japanese paper.

MODE FOR CARRYING OUT THE INVENTION

Next, a method for producing a carbon material of the present invention will be described below.

The method for producing a carbon material of the present invention is characterized by comprising the steps of: allowing a cellulosic material and/or a regenerated cellulosic material to adsorb a sulfonic acid; and heating the cellulosic material and/or the regenerated cellulosic material which has adsorbed the sulfonic acid at a temperature of 600-2800° C., and preferably of 600-1000° C., in an inert gas atmosphere.

In the step of allowing a cellulosic material and/or a regenerated cellulosic material to adsorb a sulfonic acid, the method of immersion in an aqueous solution of a sulfonic acid is not particularly limited, and examples of the method include a method in which an aqueous solution of a sulfonic acid is sprinkled over a cellulosic material; a method in which a cellulosic material is brought into contact with the vapor of a vaporized sulfonic acid; a method in which a mixture of fibers of a cellulosic material and/or a regenerated cellulosic material in an aqueous solution of a sulfonic acid is subjected to paper-making; and the like. A method of immersing a cellulosic material in an aqueous solution of a sulfonic acid is preferred. The temperature at the time of immersion in an aqueous solution of a sulfonic acid is not particularly limited, but room temperature is preferred. The immersion time is preferably from 5 to 120 minutes, and more preferably from 5 to 30 minutes. The immersion allows the cellulosic material to adsorb, for example, 1-150% by mass of, and preferably 5-60% by mass of a sulfonic acid. The cellulosic material is preferably retrieved and dried after the immersion. Any method may be acceptable as a drying method, including, for example, leaving the cellulosic material at room temperature, placing the cellulosic material in a drying machine, and the like. Drying may be continued until excess water is evaporated after retrieval of the cellulosic material from the aqueous solution of a sulfonic acid and the sample weight does not change any more. For example, in cases where drying is carried out by leaving the cellulosic material at room temperature, the drying time may be a half day or more. After almost no further mass change due to drying is observed, the cellulosic material is subjected to the heating treatment step.

In the method for producing a carbon material of the present invention, cellulosic materials and/or regenerated cellulosic materials used as raw materials refer to materials mainly composed of cellulose derivatives. Cellulose and cellulose derivatives include cellulose and cellulose derivatives of any origin, such as chemical compounds, plant-derived cellulose, regenerated cellulose, cellulose produced by bacterium, and the like. Examples thereof include plant cellulosic materials produced by higher plants including so-called trees, and regenerated cellulosic materials composed of long fibers, which are produced via dissolution of short cellulose fibers, which are collected from cotton and pulp, by a chemical treatment. Cellulosic materials and/or regenerated cellulosic materials are cellulosic materials in a variety of forms ranging from one dimensional to three dimensional forms, including fibrous materials, film-shaped materials, or materials in three dimensional configurations. The present invention has enabled destruction of the shapes of even the materials in such various forms and reduction in carbon yield during carbonization at high temperature to be prevented. Examples of preferred cellulosic materials to obtain such effects include spun yarns, monofilaments, paper, films, sheets, woven fabrics, knitted fabrics, absorbent cotton balls, and the like.

A variety of aliphatic and aromatic compounds having a sulfo group(s) can be used as sulfonic acids. The cellulose molecule, which composes cellulosic materials and/or regenerated cellulosic materials, is represented by a chemical formula: $(C_6(H_2O)_5)_n$, which is also considered to be a molecule composed of carbon and water. In the method of the present invention, a sulfonic acid removes only water ($H_2O$) from cellulose molecules through the dehydrating function thereof during the heat treatment of cellulosic materials and, thus, generation of a hydrocarbon gas, which is associated with typical pyrolysis processes, does not occur and carbon components in cellulose molecules are hardly lost, which is therefore considered to prevent reduction of the finally remaining amount of carbon materials. A sulfonic acid which can be used in the present invention may be any of organic compounds as long as a sulfo ($-SO_3H$) group(s) is/are attached to the carbon skeleton in each of the organic compounds, and is preferred to be a low-molecular-weight compound that is handled easily. A single or plural number of sulfo groups may be attached thereto. Specific examples of sulfonic acids which can be used include, for example, compounds represented by $R-SO_3H$ (wherein, R represents a linear or branched alkyl group having 1-20 carbon atoms, a cycloalkyl group having 3-20 carbon atoms, or an aryl group having 6-20 carbon atoms, each of which alkyl, cycloalkyl and aryl groups may be optionally substituted by a alkyl group(s), a hydroxyl group(s), and/or a halogen atom(s)). Specific compound examples of sulfonic acids include, for example, methanesulfonic acid, ethanesulfonic acid, propanesulfonic acid, 1-hexanesulfonic acid, vinylsulfonic acid, cyclohexanesulfonic acid, p-toluenesulfonic acid, p-phenolsulfonic acid, naphthalenesulfonic acid, benzenesulfonic acid, camphorsulfonic acid, and the like. Preferably, the sulfonic acid is one or more selected from the group consisting of methanesulfonic acid, p-toluenesulfonic acid, naphthalenesulfonic acid, benzenesulfonic acid and camphorsulfonic acid. A sulfonic acid may be used alone, or two or more sulfonic acids may be used in combination.

In cases where an aqueous solution of a sulfonic acid is used, the concentration is preferably 0.1-2.0 mol/L, and more preferably 0.5-1.0 mol/L.

Next, at the heat treatment step (carbonization step), the cellulosic material and/or the regenerated cellulosic material, which has undergone the above-described adsorption step with a sulfonic acid, is carbonized at a heating temperature of 600° C.-2800° C., and preferably of 600° C.-1000° C., in an inert gas atmosphere. This allows a carbon material to be obtained, in which the shape thereof is retained as it was. When this heating temperature is less than 600° C., the carbon content in a carbonized material is not more than 80% by mass, which means insufficient carbonization. On the other hand, when the heating temperature is even more than 2800° C., the carbonization state is hardly changed any further.

Specifically, for example, the cellulosic material and/or the regenerated cellulosic material, which has undergone the above-described adsorption step with a sulfonic acid, is first heated, with the shape thereof being retained, by using an electric furnace at a temperature in the above-described range in a nitrogen or argon gas atmosphere. The heating time in this step depends on the heating temperature and is preferably 0.5-1 hour. Moreover, the temperature rising rate from room temperature to a predefined heating temperature is preferably 3-8° C./min. A high temperature furnace such as a tubular furnace and an electric furnace can be used in an inert gas atmosphere at the heat treatment step and in this case desulfurization of a sulfur-based gas, which is generated from a sulfonic acid in a small quantity, is preferably carried out with an exhaust pipe for the inert gas, which is packed with adsorptive materials such as activated carbon.

Carbon materials can be obtained by the above-described method for producing a carbon material of the present invention, with the shapes of cellulosic materials and/or regenerated cellulosic materials used as raw materials being retained. Assuming that all carbons contained in cellulose are left in the form of a carbonized material, the carbonization yield would be theoretically 44.4% by mass. According to the present invention, a carbon material having a high carbonization yield of preferably not less than 30% by mass, and in some cases not less than 40% by mass, can be produced.

Next, another production method of the present invention will be described below. Another method for producing a carbon material of the present invention is characterized by comprising the steps of: allowing a cellulosic material and/or a regenerated cellulosic material to adsorb a sulfonic acid; heating the cellulosic material and/or the regenerated cellulosic material which has adsorbed the sulfonic acid at a temperature of 600-2800° C. in an inert gas atmosphere; and reheating the heat-treated sample at a temperature of 1800-3000° C. in an inert gas atmosphere.

Another production method of the present invention has similar steps to those in the above-described method for producing a carbon material right up to the heat treatment step. At the heat treatment step, the cellulosic material and/or the regenerated cellulosic material, which has undergone the absorption step with a sulfonic acid, is first carbonized in a similar manner to that described above at a heating temperature of not less than 600° C. and not more than 2800° C. in an inert gas atmosphere. The heating time in this step depends on the heating temperature and is preferably 0.5-1 hour. This allows a carbon material to be obtained, in which the shape of the cellulosic material is retained as it was.

Then, at the reheating step (partial graphitization step), preferably after returning the temperature of the carbon material, which has heat-treated at the above-described step, to room temperature, reheating is carried out at a temperature of 1800° C.-3000° C., and preferably of 1800° C.-2800° C., in an inert gas atmosphere. This allows a carbon material to be obtained, which retains the original shape of the cellulosic material and is partially graphitized. When this reheating temperature is less than 1800° C., graphitization (crystallization) hardly proceeds. On the other hand, when the reheating temperature is even more than 3000° C., the extent of graphitization is hardly changed any further.

Specifically, for example, the carbon material, which has been obtained at the carbonization step, is heated in a similar manner to that in the carbonization step, with the shape thereof being retained, by using an electric furnace at a temperature in the above-described range in an argon gas atmosphere. The heating time depends on the heating temperature and is preferably 0.5-1 hour.

Additionally, in another production method of the present invention, a carbon material, which has been obtained through carbonization at a temperature of 600° C.-1000° C., may be further heated for partial graphitization at a temperature of 1800° C.-3000° C. after cooling down the carbon material to room temperature once, or a carbon material, which has been obtained through carbonization at a temperature of 600° C.-1000° C., may be immediately reheated for graphitization to a temperature of 1800° C.-3000° C. in a continuous manner, which can provide a similar effect on graphitization.

A carbon material obtained through the first carbonization process is a material having a conductivity of a few Siemens per cm, which almost retains the shape thereof, although some shrinkage in size is observed. Heating this carbon material at a temperature of 1800° C.-3000° C. in the partial graphitization process allows graphitization to proceed in the material, which results in improvement of the conductivity and the conductivity increases to not less than tens of Siemens per cm.

EXAMPLES

Example 1

A sheet of sample sisal paper produced by a traditional Japanese paper making method (60×80 mm, 0.5 mm of thickness) was immersed in a 0.1 mol/L aqueous solution of p-toluenesulfonic acid for 10 minutes at room temperature. Then, the sisal paper produced by a traditional Japanese paper making method was retrieved from the aqueous solution and dried for 12 hours at room temperature. The content of the adsorbed sulfonic acid was 9% by mass. This sample was sandwiched between two carbon plates and heated using an electric furnace for 60 minutes at 800° C. in an argon gas atmosphere to carry out carbonization. At this step, an exhaust pipe for argon gas contained a small amount of activated charcoal for desulfurization. After carbonization, the electric furnace was cooled down to room temperature and the carbonized sample (carbonized paper) was retrieved. The carbonization yield thereof was identified and the carbonization yield was 32% by mass.

Example 2

Carbonized paper was produced in a similar manner to that in Example 1, except that 1.0 mol/L of methanesulfonic acid was used instead of p-toluenesulfonic acid. The content of the absorbed methanesulfonic acid was 60% by mass. The carbonization yield of the obtained carbonized paper was 38% by mass.

Comparative Example 1

A sheet of sisal paper produced by a traditional Japanese paper making method as used in Example 1 was not immersed in p-toluenesulfonic acid and immediately heated using an electric furnace for 60 minutes at 800° C. in an argon gas atmosphere to carry out carbonization. After carbonization, the electric furnace was cooled down to room temperature and the carbonized sample was retrieved. The carbonization yield thereof was identified and the carbonization yield was 17% by mass.

Example 3

A sheet of sample gampi (*Diplomorpha sikokiana*) paper produced by a traditional Japanese paper making method (80×100 mm, 0.3 mm of thickness) was immersed in a 0.1 mol/L aqueous solution of p-toluenesulfonic acid for 20 minutes at room temperature. Then, the gampi paper produced by a traditional Japanese paper making method was retrieved from the aqueous solution and dried for 36 hours at room temperature. The content of the adsorbed sulfonic acid was 6% by mass. This sample was heated by a method totally identical to that in Example 1 to produce carbonized paper. The carbonization yield thereof was identified and the carbonization yield was 32% by mass.

Example 4

Carbonization was carried out in a similar manner to that in Example 3, except that 1.0 mol/L of methanesulfonic acid was used instead of p-toluenesulfonic acid. The content of the absorbed methanesulfonic acid was 61% by mass. The carbonization yield of the obtained carbonized paper was 35% by mass.

Comparative Example 2

A sheet of gampi paper produced by a traditional Japanese paper making method as used in Example 3 was not immersed in p-toluenesulfonic acid and immediately heated using an electric furnace for 60 minutes at 800° C. in an argon gas atmosphere to carry out carbonization. After carbonization, the electric furnace was cooled down to room temperature and the carbonized sample was retrieved. The carbonization yield thereof was identified and the carbonization yield was 18% by mass.

Example 5

A sheet of sample regenerated cellulose paper (60×67 mm, 0.53 mm of thickness) was immersed in a 0.1 mol/L aqueous solution of p-toluenesulfonic acid for 10 minutes at room temperature. Then, the sample was retrieved from the aqueous solution and dried for 36 hours at room temperature. The content of the adsorbed sulfonic acid was 14% by mass. This sample was heated by a method totally identical to that in Example 1 to produce carbonized paper. The carbonization yield thereof was identified and the carbonization yield was 33% by mass.

Example 6

A sheet of sample filter paper (80×100 mm, 0.34 mm of thickness) was immersed in a 1.0 mol/L aqueous solution of methanesulfonic acid for 20 minutes at room temperature. Then, the sample was retrieved from the aqueous solution and dried for 36 hours at room temperature. The content of the adsorbed sulfonic acid was 38% by mass. This sample was heated by a method totally identical to that in Example 1 to produce carbonized paper. The carbonization yield thereof was identified and the carbonization yield was 35% by mass.

Example 7

A sample cotton thread (spun yarn, 1 mm of diameter) was immersed in a 2.0 mol/L aqueous solution of methanesulfonic acid for 120 minutes at room temperature. Then, the sample was retrieved from the aqueous solution and dried for 12 hours at room temperature. The content of the adsorbed sulfonic acid was 43% by mass. This sample was heated by a method totally identical to that in Example 1 to carry out carbonization to produce a carbon fiber. The carbonization yield thereof was identified and the carbonization yield was 38% by mass.

Example 8

A sample, a commercial absorbent cotton ball, was immersed in a 0.1 mol/L aqueous solution of p-toluenesulfonic acid for 10 minutes at room temperature. Then, the sample was retrieved from the aqueous solution and dried for 36 hours at room temperature. The content of the adsorbed sulfonic acid was 46% by mass. This sample was heated by a method totally identical to that in Example 1 to produce a carbonized absorbent cotton ball. The carbonization yield thereof was identified and the carbonization yield was 40% by mass.

INDUSTRIAL APPLICABILITY

Carbon materials obtained through the production methods of the present invention are quite useful for carbon films, carbon fibers, materials for various electronic devices such as a nano-conductive material, electrode materials for various cells, various gas storage materials, various gas storage and adsorption materials, heat conductive and emitting materials, catalyst carriers, filter media, electron emission materials, and the like.

The invention claimed is:

1. A method for producing a carbon material, the method comprising the steps of: allowing a cellulosic material and/or a regenerated cellulosic material to adsorb a sulfonic acid; heating the cellulosic material and/or the regenerated cellulosic material which has adsorbed the sulfonic acid at a temperature of 600-2800° C. in an inert gas atmosphere;
   the step of adsorbing the sulfonic acid is performed by immersing a cellulosic material in an aqueous solution of the sulfonic acid; and
   the concentration of the sulfonic acid in the aqueous solution is 0.1-2.0 mol/L.

2. A method for producing a carbon material, the method comprising the steps of: allowing a cellulosic material and/or a regenerated cellulosic material to adsorb a sulfonic acid; heating the cellulosic material and/or the regenerated cellulosic material which has adsorbed the sulfonic acid at a temperature of 600-2800° C. in an inert gas atmosphere; and reheating the heat-treated cellulosic material at a temperature of 1800-3000° C. in an inert gas atmosphere;

the step of adsorbing the sulfonic acid is performed by immersing a cellulosic material in an aqueous solution of the sulfonic acid; and the concentration of the sulfonic acid in the aqueous solution is 0.1-2.0 mol/L.

3. The method for producing a carbon material according to claim 1, wherein the sulfonic acid is one or more selected from the group consisting of methanesulfonic acid, p-toluenesulfonic acid, naphthalenesulfonic acid, benzenesulfonic acid and camphorsulfonic acid.

4. The method for producing a carbon material according to claim 1, wherein the cellulosic material and/or the regenerated cellulosic material is in a form selected from the group consisting of spun yarn, monofilament, paper, film, sheet, woven fabric and knitted fabric.

5. The method for producing a carbon material according to claim 1, wherein the carbon material obtained after the step of heating retains the form of the cellulosic material and/or the regenerated cellulosic material.

6. The method for producing a carbon material according to claim 1, wherein the cellulosic material and/or the regenerated cellulosic material is in a form selected from the group consisting of spun yarn, monofilament, paper, film, sheet, woven fabric and knitted fabric; and wherein the carbon material obtained after the step of heating retains the form of the cellulosic material and/or the regenerated cellulosic material.

* * * * *